United States Patent
Kong et al.

(10) Patent No.: US 6,998,723 B2
(45) Date of Patent: Feb. 14, 2006

(54) ELECTRICAL GENERATING SYSTEM HAVING A MAGNETIC COUPLING

(76) Inventors: Carl Cheung Tung Kong, 6122 Whittier Blvd., Los Angeles, CA (US) 90022; John Kong, 6122 Whittier Blvd., Los Angeles, CA (US) 90022

(*) Notice: Subject to any disclaimer, the term of this patent is extended or adjusted under 35 U.S.C. 154(b) by 94 days.

(21) Appl. No.: 10/691,010

(22) Filed: Oct. 21, 2003

(65) Prior Publication Data

US 2004/0080227 A1   Apr. 29, 2004

Related U.S. Application Data

(63) Continuation-in-part of application No. 10/213,570, filed on Aug. 6, 2002, now Pat. No. 6,700,263.

(51) Int. Cl.
*H02P 9/04* (2006.01)

(52) U.S. Cl. .................. 290/1 C; 290/44; 290/4 C; 310/103; 310/83; 310/75 R; 310/113

(58) Field of Classification Search ............. 290/1 C, 290/4 C; 310/103, 93
See application file for complete search history.

(56) References Cited

U.S. PATENT DOCUMENTS

| | | | |
|---|---|---|---|
| 3,240,304 A | * | 3/1966 | Wickersham ............ 192/56.42 |
| 3,860,844 A | | 1/1975 | Hetzel |
| 4,296,654 A | * | 10/1981 | Mercer ...................... 81/57.26 |
| 4,556,801 A | * | 12/1985 | Gervasio et al. ............ 290/44 |
| 4,572,961 A | * | 2/1986 | Borger ....................... 290/4 R |
| 4,718,233 A | | 1/1988 | Barrett |
| 5,880,548 A | * | 3/1999 | Lamb ......................... 310/103 |
| 6,054,788 A | * | 4/2000 | Dombrovski et al. ....... 310/103 |
| 6,072,258 A | * | 6/2000 | Lamb ......................... 310/191 |
| 6,118,194 A | | 9/2000 | Kawamura |
| 6,129,193 A | * | 10/2000 | Link ......................... 192/84.1 |
| 6,240,890 B1 | * | 6/2001 | Abthoff et al. .......... 123/179.3 |
| 6,304,002 B1 | | 10/2001 | Dehlsen et al. |
| 6,793,600 B1 | * | 9/2004 | Hiraiwa ....................... 475/5 |

FOREIGN PATENT DOCUMENTS

JP         59097361 A    *  6/1984

* cited by examiner

Primary Examiner—Darren Schuberg
Assistant Examiner—Yahveh Comas
(74) Attorney, Agent, or Firm—Kelly Lowry & Kelley, LLP

(57) ABSTRACT

An electrical generating system includes an electric motor coupled to a variable power source. A variable coupling is connected to an output shaft of the motor. The variable coupling includes opposed first and second plates each having permanent magnets affixed thereto and arranged such that rotation of the first plate by the motor causes the second plate to rotate by repulsive magnetic force. A switching mechanism adjusts the variable coupling. A gear assembly having a high transmission ratio is connected to the variable coupling. Preferably, at least one electrical generator is connected to the gear assembly for generating electricity.

26 Claims, 4 Drawing Sheets

ELECTRICAL GENERATING SYSTEM HAVING A MAGNETIC COUPLING

RELATED APPLICATION

This is a continuation-in-part of U.S. patent application Ser. No. 10/213,570, filed Aug. 6, 2002 now U.S. Pat. No. 6,700,263.

BACKGROUND OF THE INVENTION

The present invention generally relates to electrical generating systems. More particularly, the present invention relates to an electrical generating system utilizing a magnetic coupling arrangement.

Electrical generating systems are useful in a number of applications. Such electrical generating systems can comprise hydroelectric turbines, wind powered generating devices, or even solar panel arrays. With respect to solar panel arrays, there is often a need to convert the direct current electricity generated from the solar panel array into mechanical motion, or alternating current.

Accordingly, there is a need for an electrical generating system for producing electricity. Such an electrical generating system should have the capability of converting a direct current, such as from a solar panel array, to an alternating current or mechanical movement. The present invention fulfills these needs and provides other related advantages.

SUMMARY OF THE INVENTION

The present invention resides in an electrical generating system which generally comprises an electric motor coupled to a variable power source. A variable coupling is connected to an output shaft of the motor. A switching mechanism adjusts the variable coupling. In turn, a gear assembly is connected to the variable coupling. An electrical generator is connected to the gear assembly.

The variable coupling comprises opposed first and second plates, each having permanent magnets affixed thereto. More particularly, the first plate is connected to the output shaft of the motor and includes radially positioned, spaced apart permanent magnets extending from a face thereof. The second plate is in spaced relation to the first plate and also includes radially positioned, spaced apart permanent magnets extending therefrom. The first and second plates are positioned such that the permanent magnets extend between one another, whereby a rotation of the first plate by the motor causes the second plate to rotate by repulsive magnetic force. Extension of the permanent magnets on at least one of the plates is adjustable.

The first plate of the variable coupling includes at least one solenoid for adjusting or disengaging the variable coupling.

In a particularly preferred embodiment, the gear assembly comprises a first gear rotatably connected to the variable coupling and rotatably engaged with the second gear of a smaller diameter. The second gear is rotatably engaged with the third gear having a larger diameter than the second gear. The third gear is in operable connection with the electrical generator. As such, the gear assembly has a high transmission ratio, typically at least 100 to 1. In a particularly preferred embodiment, a second electrical generator is connected to the third gear of the gear assembly.

The electrical generator is electrically coupled to the motor.

The electrical generating system further includes an external device. A fourth gear, located between the second and third gears, is connected to a fifth gear operatively connected to a second variable coupling connected which, in turn, is connected to the external device. The external device includes a rotating blade.

The second variable coupling comprises opposed first and second plates each having permanent magnets affixed thereto; wherein the magnets on one of the plates are adjustable. The first plate of the second variable coupling is connected to the fifth gear and includes radially positioned, spaced apart permanent magnets extending therefrom. The second plate of the second variable coupling is in spaced relation to the first plate of the second variable coupling and includes radially positioned, spaced apart permanent magnets extending therefrom so as to extend between the permanent magnets of the first plate of the second variable coupling. Extension of the permanent magnets on at least one of the plates of the second variable coupling is adjustable, by at least one solenoid connected to the one of plates of the second variable coupling. The rotation of the first plate of the second variable coupling by the motor causes the second plate of the second variable coupling to rotate by repulsive magnetic force.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT(S)

As shown in the accompanying drawings for purposes of illustration, the present invention resides in an electrical generating system, generally referred to by the reference number 10. A particularly unique feature of the present invention is the utilization of a magnetic coupling 12, as will be described more fully herein.

Figure 1:
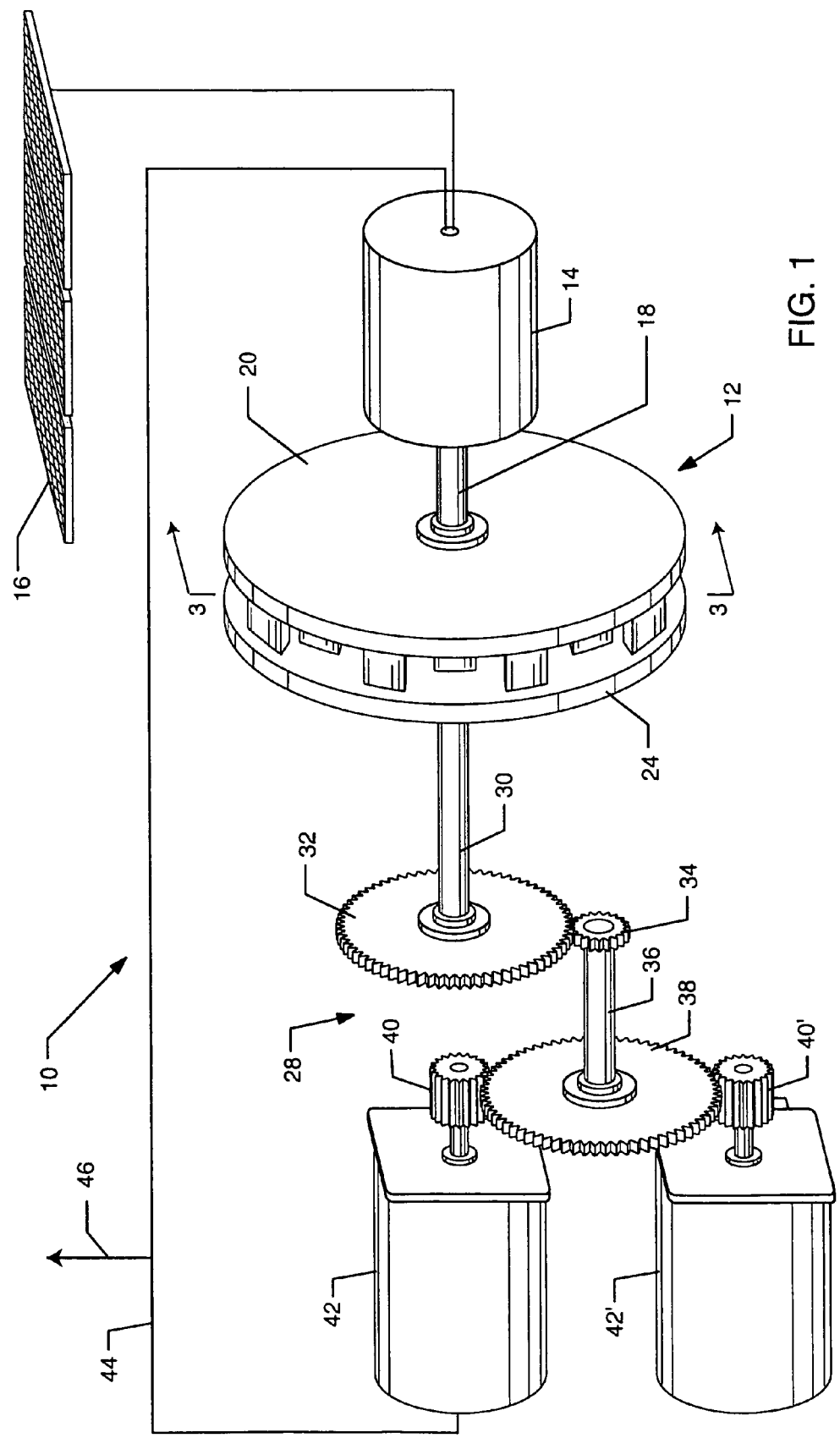
FIG. 1 is a perspective view of an electrical generating system embodying the present invention.

With reference to FIG. 1, an electric motor 14 is provided to rotate the magnetic coupling 12. The motor 14 may comprise a ½ to 1 horsepower, 450 to 900 watt motor. A power source is provided to power the motor. In a particularly preferred embodiment, as illustrated, the power source comprises a solar panel array 16 or battery capable of generating sufficient electricity to power the motor 14.

Figure 2:
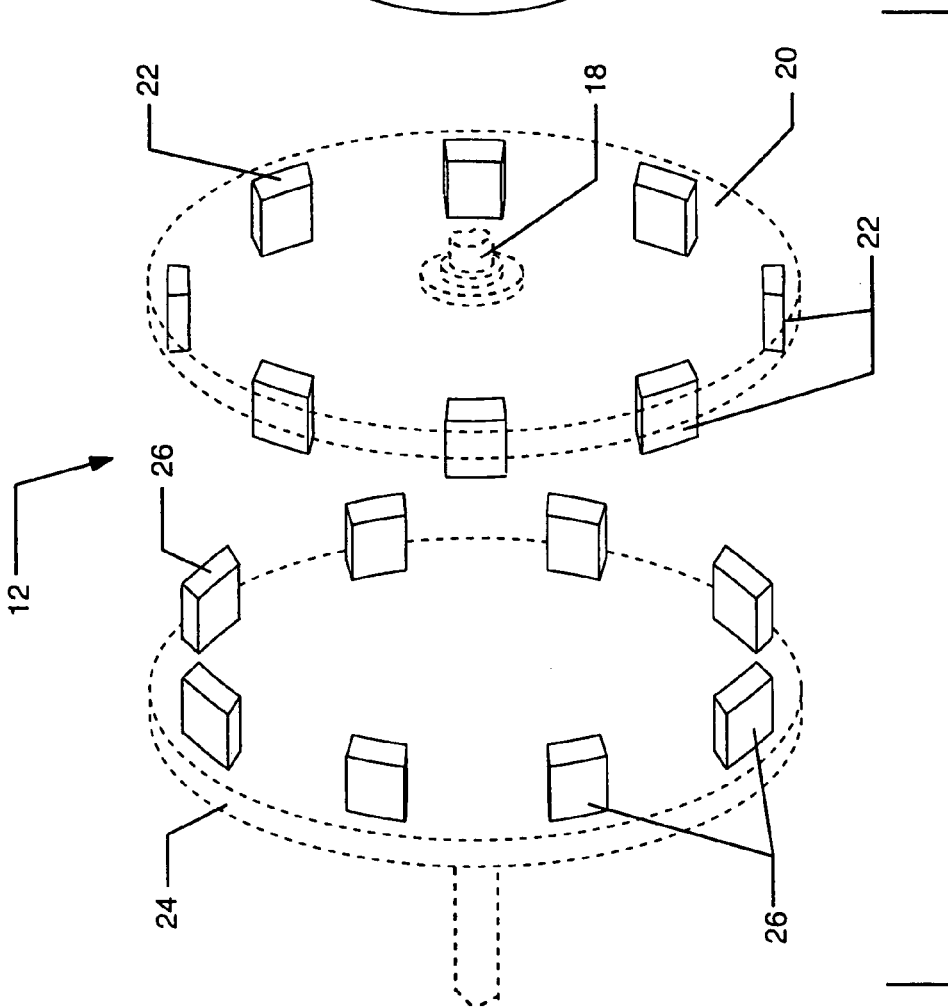
FIG. 2 is a perspective view of a magnetic coupling used in accordance with the present invention.
Figure 4:
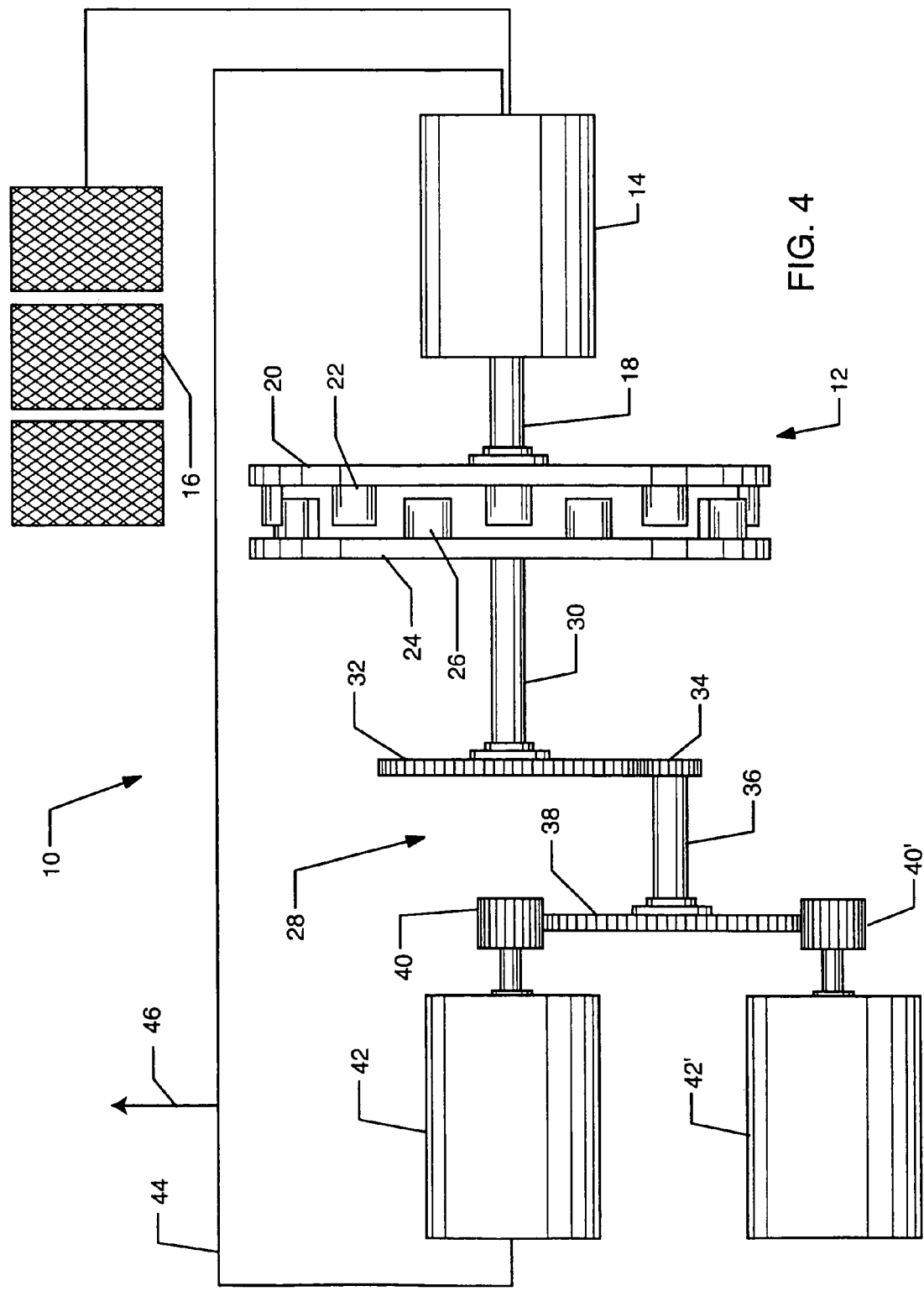
FIG. 4 is a side elevational view of the electrical generating system of the present invention, illustrating the staggered relationship of the magnets of the magnetic coupling.

With continuing reference to FIG. 1, the motor 14 may include a single output shaft 18, or multiple shafts. A first plate 20 of the magnetic coupling 12 is connected to the output shaft 18 of the motor 14. As shown in FIG. 2, the plate 20 includes a plurality of permanent magnets 22 extending from a surface thereof generally opposite the motor 14 and in spaced relationship to one another. A second plate 24 of the magnetic coupling 12 also includes a plurality of permanent magnets 26 extending from a surface thereof and spaced apart from one another. The second plate 24 is positioned adjacent to the first plate 20 in a spaced relationship such that the magnets 22 and 26 of each plate 20 and 24, respectively, are generally aligned with one another in staggered and radial formation. The magnets 22, 26 should be positioned as far from the axis of the output shaft 18 as possible. Indeed, the coupling of the plates 20, 24 can be effected in many different ways provided the coupling connection is as far from the axis of the output shaft as possible.

Figure 3:
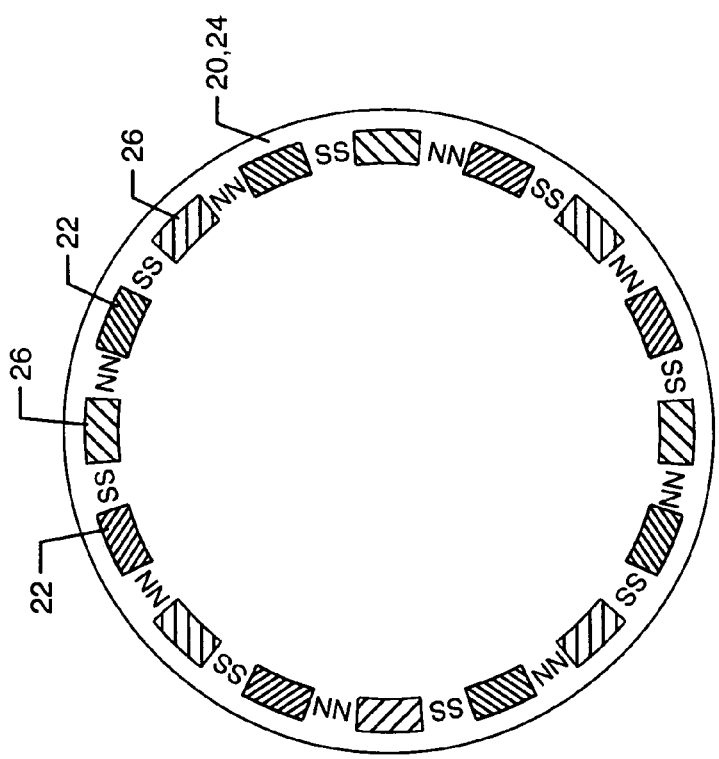
FIG. 3 is a schematic view of permanent magnets of each plate of the magnetic coupling, illustrating the staggered alignment thereof.

With reference now to FIG. 3, the magnets 22 and 26 of the first and second plates 20 and 24 are shown in a preferred arrangement. It will be noted that the north poles of adjacent magnets 22 and 26 face one another, as do the south poles. Thus, as the motor 14 turns the first plate 20 via shaft 18, the second plate 24 of the magnetic coupling is rotated by the magnetic repulsive forces of the permanent magnets 22 and 26. Preferably, the magnets 22 and 26 and plates 20 and 24 never contact one another during operation, the transmission of rotational energy being delivered through the magnetic repulsive forces of the aligned magnets 22 and 26.

A gear assembly 28 is connected to the second plate 24 of the magnetic coupling 12. In a particularly preferred embodiment, a shaft 30 extends from the second plate 24 to a tooth gear 32. This first gear 32 rotates in a 1:1 relationship with the second plate 24. The first gear 32 is rotatably engaged with a much smaller second gear 34. Preferably, the second gear 34 is 1/10 the diameter of the first gear 32 such that it rotates through ten revolutions for each revolution of the first gear 32. A shaft 36 extends between the second gear 34 and a third gear 38 having a larger diameter than the second gear 34. However, due to the fact that the second and third gears 34 and 38 are interconnected with shaft 36, they rotate on a 1:1 relationship. Thus, for each revolution of the second plate 24 of the magnetic coupling 12, the third gear 38 rotates ten times. The third gear 38 is rotatably engaged with a gear 40 or 40' of an electrical generator 42 or 42'. Preferably, there is at least a 10:1 relationship between a third gear 38 and the electrical generator gear 40 so that the transmission effect of the gear assembly 28 is at least 100:1. In a particularly preferred embodiment, there is a 10.8:1 relationship between the third gear 38 and electrical generator gears 40 and 40'. Thus, for each rotation of the magnetic coupling 12, the electrical generator gear rotates through 108 revolutions.

In a particularly preferred embodiment, two electrical generators 42 and 42' are connected to the gear assembly 28. These electrical generators can comprise 4,000 watt generators. The generators 42 and 42' are connected via electrical leads 44 to the motor 14 and/or an electrical outlet 46. It is well-known in the art that a solar panel array will produce direct current electricity, whereas an electrical generator will produce alternating current.

Instead of connecting the gear assembly 28 to electrical generators 42, the invention contemplates the connection of a propeller or wheel to perform mechanical functions. Thus, the electricity from the solar panel array 16, or other power source, is transferred into mechanical motion.

Although FIGS. 1–4 illustrates a single magnetic coupling 12, gear assembly 28 and pertinent electrical generating attachments or the like, it should be understood by the reader that a motor 14 can comprise a multishaft motor wherein these components extend from either side of the motor 14, creating a mirror image of the above described system 10.

Figure 5:
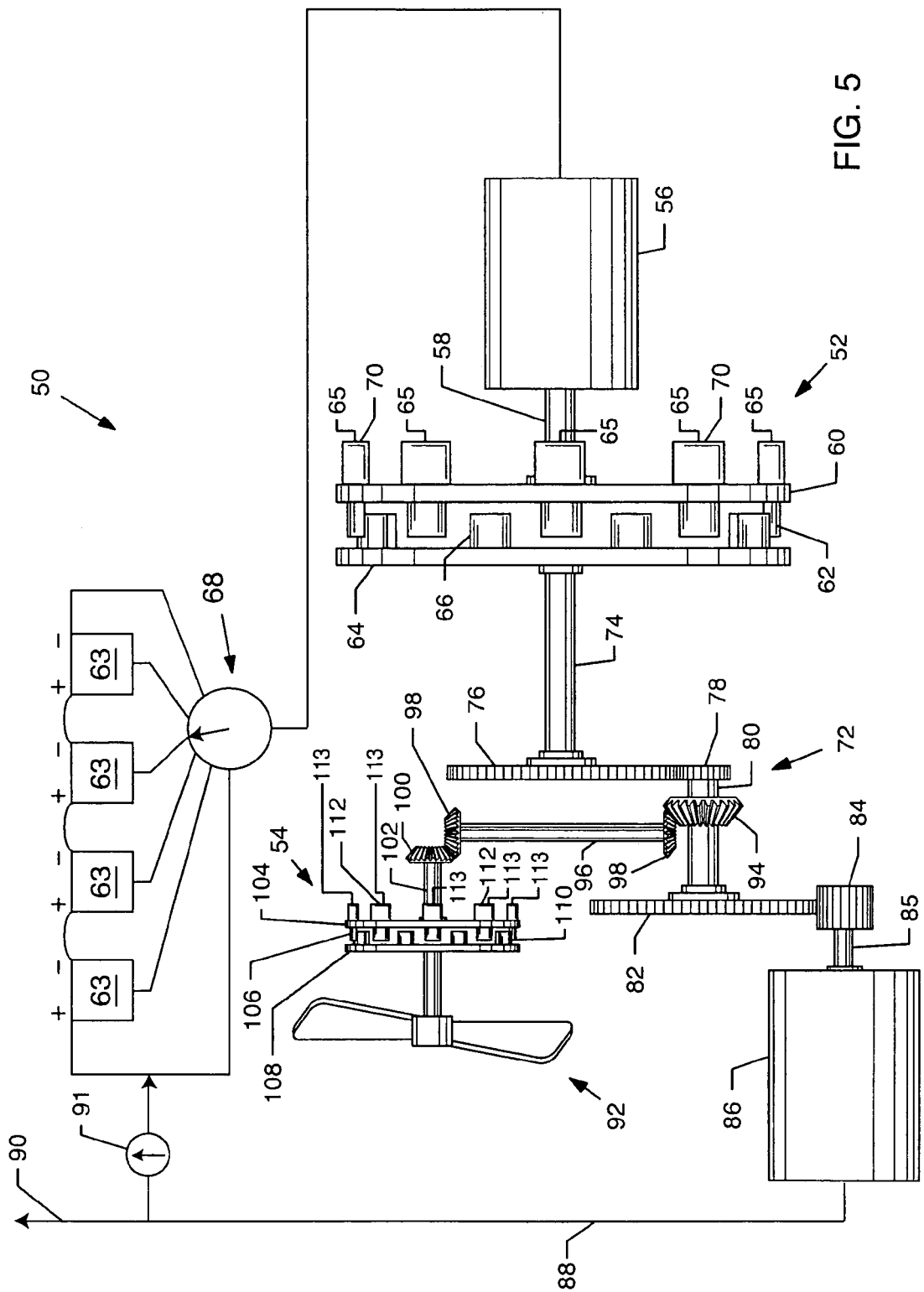
FIG. 5 is a side elevational view of another embodiment of the electrical generating system of the present invention, illustrating the switching system for adjusting or disengaging the magnets of the magnetic coupling.

As shown in FIG. 5, the present invention further resides in an electrical generating system, generally referred to by the reference number 50 and the use of variable magnetic couplings 52, 54.

With reference to FIG. 5, an electric motor 56 is provided to rotate a first variable magnetic coupling 52. The motor 56 may comprise a ½ to 1 horsepower, 450 to 900 watt DC motor.

With continuing reference to FIG. 5, the motor 56 may include a single output shaft 58, or multiple shafts. A first plate 60 of the first variable magnetic coupling 52 is connected to the output shaft 58 of the motor 56. The plate 60, similar to the plate 20 of FIG. 2, includes a plurality of permanent magnets 62 extending from a surface thereof generally opposite the motor 56 and in spaced relationship to one another. A second plate 64 of the magnetic coupling 52, similar to the plate 24 of FIG. 2, also includes a plurality of permanent magnets 66 extending from a surface thereof and spaced apart from one another. The second plate 64 is positioned adjacent to the first plate 60 in a spaced relationship such that the magnets 62 and 66 of each plate 20 and 24, respectively, are generally aligned with one another in staggered and radial formation. The magnets 62, 66 should be positioned as far from the axis of the output shaft 58 as possible. Indeed, the coupling of the plates 60, 64 can be effected in many different ways provided the coupling connection is as far from the axis of the output shaft 58 as possible.

The magnets 62 and 66 of the first and second plates 60 and 64 are arranged in a fashion similar to that shown in FIG. 2 such that the north poles of adjacent magnets 62 and 66 face one another, as do the south poles. Thus, as the motor 56 turns the first plate 60 via shaft 58, the second plate 64 of the magnetic coupling is rotated by the magnetic repulsive forces of the permanent magnets 62 and 66. Preferably, the magnets 62 and 66 and plates 60 and 64 never contact one another during operation, the transmission of rotational energy being delivered through the magnetic repulsive forces of the aligned magnets 62 and 66.

A switching mechanism 68 adjusts the speed of the couplings 52, 54. Power is supplied to the system 50 by a plurality of batteries 63 electrically connected to the switching mechanism 68. The switching mechanism 68 allows a user to select the number of batteries 63 supplying power to the system 50 increasing the power to the system 50; increasing the power to the system 50 increases the speed the motor 56 turns the shaft 58.

The variable magnetic coupling 52 is variable in that the magnetic coupling of the plates 60, 64 is adjustable by a plurality of solenoids 70 mechanically connected to the first plate 60 that allow a user to vary or disengage the magnetic coupling of the plates 60, 64 by adjusting the position of the magnets 62 on the first plate 60. Power is supplied to each solenoid 70 by a battery 65. The solenoids 70 are controlled by any number of conventional means (not shown) which can adjust the number of solenoids 70 activated at any given time to adjust the extension of a desired number of magnets 62.

The solenoids 70 control the extension of the permanent magnets 62 of the first plate 60 towards the magnets 66 of the second plate 64. A user controls the number of magnets 66 extending towards the magnets 66 of the second plate 64, as well as the amount of length the magnets 62 extend towards the magnets 66 of the second plate 64. The magnets 62 are operationally connected to the solenoids 70 and mounted within apertures of the first plate 60 such that the magnets 62 are able to move perpendicularly within apertures (not shown) of the first plate 60.

If a user desires to increase the magnetic coupling of the plates 60, 64 to a maximum, the user adjusts the number of magnets 62 are at their maximum extension. If a user desires to minimize or disengage the magnetic coupling of the plates 60, 64, the user adjusts the number of magnets 62 that are at their minimum extension.

A gear assembly 72 is connected to the second plate 64 of the magnetic coupling 52. In a particularly preferred embodiment, a shaft 74 extends from the second plate 64 to a tooth gear 76. This first gear 76 rotates in a 1:1 relationship with the second plate 64. The first gear 76 is rotatably engaged with a much smaller second gear 78. Preferably, the second gear 64 is 1/10 the diameter of the first gear 76 such that it rotates through ten revolutions for each revolution of the first gear 76. A shaft 80 extends between the second gear 78 and a third gear 82 having a larger diameter than the second gear 78. However, due to the fact that the second and third gears 78 and 82 are interconnected with shaft 80, they rotate on a 1:1 relationship. Thus, for each revolution of the second plate 64 of the magnetic coupling 52, the third gear 82 rotates ten times. The third gear 82 is rotatably engaged with a gear 84 connected by a shaft 85 to an electrical generator 86. Preferably, there is at least a 10:1 relationship between a third gear 82 and the electrical generator gear 84 so that the transmission effect of the gear assembly 72 is at least 100:1. In a particularly preferred embodiment, there is a 10.8:1 relationship between the third gear 82 and electrical generator gear 84. Thus, for each rotation of the magnetic coupling 52, the electrical generator gear 84 rotates through 108 revolutions.

The electrical generator 86 can comprise a 4,000 watt generator. The generator 86 is connected via electrical leads 88 to the motor 56 and/or an electrical outlet 90. It is well-known in the art that an electrical generator will produce alternating current. An AC/DC converter 91 is electrically connected to the generator 86 or in series with the battery 63.

In addition to connecting the gear assembly 72 to the electrical generator 86, the gear assembly 72 is also connected to an external device 92 including, without limitation a device with a rotating blade (e.g., a propeller or fan) or a wheel to perform mechanical functions.

The gear assembly 72 further includes a fourth gear 94, in the form of a bevel gear, located on the shaft 80 between the second and third gears 78, 82. Alternatively, the bevel gear 94 can be located between the gear 84 and the generator 86. The fourth gear 94 is connected by a shaft 96 with bevel gears 98 on each end of the shaft 96. The fourth gear 94 engages one of the bevel gears 98, causing the shaft 96 to rotate, which in turn causes the other bevel gear 98 to rotate. The other bevel gear 98 is connected to a fifth gear 100, in the form of a bevel gear, that is connected by a shaft 102 to the second variable coupling 54, which, in turn, is operatively connected to the external device 92. Alternatively, a pulley or chain with gear may be used instead of the shaft 96.

The second variable magnetic coupling 54 is mechanically similar to the first variable magnetic coupling 52, described above. A first plate 104 of the second variable magnetic coupling 54 is connected to the shaft 102. The plate 104, similar to the plate 60, includes a plurality of permanent magnets 106 extending from a surface thereof generally opposite the shaft 102 and in spaced relationship to one another. A second plate 108 of the magnetic coupling 54, similar to the plate 64, also includes a plurality of permanent magnets 110 extending from a surface thereof and spaced apart from one another. The second plate 108 is positioned adjacent to the first plate 104 in a spaced relationship such that the magnets 106 and 110 of each plate 104 and 108, respectively, are generally aligned with one another in staggered and radial formation. The magnets 106, 110 should be positioned as far from the axis of the shaft 102 as possible. Indeed, the coupling of the plates 104, 108 can be effected in many different ways provided the coupling connection is as far from the axis of the shaft 102 as possible.

The magnets 106 and 110 of the first and second plates 104 and 108 are arranged such that the north poles of adjacent magnets 106 and 110 face one another, as do the south poles. Thus, as the first plate 104 turns, the second plate 108 of the magnetic coupling 54 is rotated by the magnetic repulsive forces of the permanent magnets 106 and 110. Preferably, the magnets 106 and 110 and plates 104 and 108 never physically contact one another during operation, the transmission of rotational energy being delivered through the magnetic repulsive forces of the aligned magnets 106 and 110.

As discussed above, the variable magnetic coupling 54 is variable in that the magnetic coupling of the plates 104, 108 is adjustable by a plurality of solenoids 112 mechanically connected to the first plate 104 that allow a user to vary the magnetic coupling of the plates 104, 108 by adjusting the position of the magnets 106 on the first plate 104. Power is supplied to each solenoid 112 by a battery 113. The solenoids 112 are controlled by any number of conventional means (not shown) which can adjust the number of solenoids 112 activated at any given time to adjust the extension of a desired number of magnets 106.

The solenoids 112 control the extension of the permanent magnets 106 of the first plate 104 towards the magnets 110 of the second plate 108. A user controls the number of magnets 106 extending towards the magnets 110 of the second plate 108, as well as the amount of length the magnets 106 extend towards the magnets 110 of the second plate 108. The magnets 106 are operationally connected to the solenoids 112 and mounted within apertures (not shown) of the first plate 106 such that the magnets 106 are able to move perpendicularly with respect to the first plate 104, within the apertures (not shown).

A switching mechanism (not shown) also allows a user to adjust the first and second variable magnetic couplings 52, 54 independent of each other such that a user can engage the generator 86 but choosing not engage the external device 92 by minimizing the extension of the magnets 106 of the second magnetic coupling 54.

In the alternative, the second variable coupling 54 can be positioned anywhere along the gear assembly 72. For example, the second coupling 54 can be positioned between the gear 84 and the generator 86.

In another alternative, various gears of the gear assembly 72 may be replaced by a series of chains, belts, and pulleys.

Although several embodiments have been described in detail for purposes of illustration, various modifications may be made without departing from the scope and spirit of the invention. Accordingly, the invention is not to be limited, except as by the appended claims.

What is claimed is:

1. An electrical generating system, comprising:
   an electric motor coupled to a external power source;
   a variable coupling connected to an output shaft of the motor;
   a switching mechanism for adjusting the variable coupling;
   a gear assembly connected to the variable coupling; and
   an electrical generator connected to the gear assembly;
   wherein the variable coupling comprises opposed first and second plates each having permanent magnets affixed thereto, wherein the first plate is connected to the output shaft of the motor and includes radially positioned, spaced apart permanent magnets extending therefrom, and the second plate is in spaced relation to the first plate and includes radially positioned, spaced apart permanent magnets extending therefrom so as to extend between the permanent magnets of the first plate, wherein extension of the permanent magnets on at least one of the plates is adjustable, whereby the rotation of the first plate by the motor causes the second plate to rotate by repulsive magnetic force.

2. The system of claim 1, wherein the first plate comprises at least one solenoid for adjusting or disengaging the variable coupling.

3. The system of claim 1, wherein the gear assembly comprises a first gear rotatably connected to the variable coupling and rotatably engaged with a second gear of smaller diameter, the second gear being rotatably engaged with a third gear having a larger diameter than the second gear, the third gear operably connected with the electrical generator.

4. The system of claim 3, wherein the gear assembly has a high transmission ratio.

5. The system of claim 4, wherein the transmission ratio from the first gear to the third gear is at least 100 to 1.

6. The system of claim 3, wherein the gear assembly further comprises a fourth gear between the second and third gears which is connected to a fifth gear, the fifth gear being operatively connected to a second variable coupling connected to an external device.

7. The system of claim 6, wherein the second variable coupling comprises opposed third and fourth plates each having permanent magnets affixed thereto, wherein the extension of the magnets on one of the plates of the second variable coupling are adjustable.

8. The system of claim 7, wherein the third plate is connected to the fifth gear and includes radially positioned, spaced apart permanent magnets extending therefrom, and the fourth plate is in spaced relation to the third plate and includes radially positioned, spaced apart permanent magnets extending therefrom so as to extend between the permanent magnets of the third plate, wherein the extension of the permanent magnets on one of the plates of the second variable coupling is adjustable by at least one solenoid connector to the one of the plates of the second variable coupling, whereby the rotation of the third plate by the motor causes the fourth plate to rotate by repulsive magnetic force.

9. The system of claim 7, wherein the external device includes a rotating blade.

10. The system of claim 1, wherein the electrical generator is electrically coupled to the motor.

11. An electrical generating system, comprising:
    an electric motor coupled to a external power source;
    a variable coupling connected to an output shaft of the motor;
    a switching mechanism for adjusting the variable coupling;
    a gear assembly connected to the magnetic coupling, the gear assembly having a high transmission ration and including a first gear rotatably connected to the variable coupling and rotatably engaging a second gear of smaller diameter, the second gear rotatably engaging a third gear having a larger diameter than the second gear; and
    an electrical generator connected to the gear assembly through the third gear and electrically coupled to the motor;
    wherein the variable coupling comprises opposed first and second plates each having permanent magnets affixed thereto, wherein the first plate is connected to the output shaft of the motor and includes radially positioned, spaced apart permanent maanets extending therefrom, and the second plate is in spaced relation to the first plate and includes radially positioned, spaced apart permanent magnets extending therefrom so as to extend between the permanent magnets of the first plate, wherein extension of the permanent magnets on at least one of the plates is adjustable, whereby the rotation of the first plate by the motor causes the second plate to rotate by repulsive magnetic force.

12. The system of claim 11, wherein the first plate comprises at least one solenoid for adjusting the variable coupling.

13. The system of claim 11, wherein the gear assembly further comprises a fourth gear between the second and third gears which is connected to a fifth gear, the fifth gear being operatively connected to a second variable coupling connected to an external device.

14. The system of claim 13, wherein the second variable coupling comprises opposed third and fourth plates each having permanent magnets affixed thereto, wherein the extension of the magnets on one of the plates of the second variable coupling are adjustable.

15. The system of claim 14, wherein the third plate is connected to the fifth gear and includes radially positioned, spaced apart permanent magnets extending therefrom, and the fourth plate is in spaced relation to the third plate and includes radially positioned, spaced apart permanent magnets extending therefrom so as to extend between the permanent magnets of the third plate, wherein extension of the permanent magnets on at least one of the plates of the second variable coupling is adjustable by at least one solenoid connected to the at least one of the plates of the second variable coupling, whereby the rotation of the third plate by the motor causes the fourth plate to rotate by repulsive magnetic force.

16. An electrical generating system, comprising:
    an electric motor coupled to a external power source;
    a first variable coupling connected to an output shaft of the motor;
    a switching mechanism for adjusting the first variable coupling, wherein the first variable coupling comprises opposed first and second plates each having permanent magnets affixed thereto, wherein the extension of the magnets on at least one of the plates of the first variable coupling are adjustable by at least one solenoid connected to the at least one plate of the first variable coupling;
    a gear assembly having a high transmission ratio connected to the first variable coupling;
    an electrical generator connected to the gear assembly and electrically coupled to the motor; and an external device;
wherein the gear assembly comprises a first gear rotatably connected to the first variable coupling and rotatably engaged with a second gear of smaller diameter, the second gear being rotatably engaged with a third gear having a larger diameter than the second gear, the third gear operably connected with the electrical generator, a fourth gear between the second and third gears, the fourth gear connected to a fifth gear operatively connected to a second variable coupling connected to the external device;
wherein the first plate is connected to the output shaft of the motor and includes radially positioned, spaced apart permanent magnets extending therefrom, and the second plate is in spaced relation to the first plate and includes radially positioned, spaced apart permanent magnets extending therefrom so as to extend between the permanent magnets of the first plate, wherein extension of the permanent magnets on at least one of the plates of the first variable coupling is adjustable by the at least one solenoid connected the at least one of the plates of the first variable coupling, whereby the rotation of the first plate by the motor causes the second plate to rotate by repulsive magnetic force;
wherein the second variable coupling comprises opposed third and fourth plates each having permanent magnets affixed thereto; wherein the extension of the magnets on one of the plates of the second variable coupling are adjustable, wherein the third plate is connected to the fifth gear and includes radially positioned, spaced apart permanent magnets extending therefrom, and the fourth plate is in spaced relation to the third plate and includes radially positioned, spaced apart permanent magnets extending therefrom so as to extend between the permanent magnets of the third plate, wherein extension of the permanent magnets on the one of the plates of the second variable coupling is adjustable, by at least one solenoid connected to the one of the plates of the second variable coupling, whereby the rotation of the third plate by the motor causes the fourth plate to rotate by repulsive magnetic force.

17. An electrical generating system, comprising:
an electric motor coupled to a external power source;
a variable coupling connected to an output shaft of the motor;
a switching mechanism for adjusting the variable coupling;
a gear assembly connected to the variable coupling; and
an electrical generator connected to the gear assembly;
wherein the gear assembly comprises a first gear rotatably connected to the variable coupling and rotatably engaged with a second gear of smaller diameter, the second gear being rotatably engaged with a third gear having a larger diameter, the second gear being rotatably engaged with a third gear having a larger diameter than the second gear, the third gear operably connected with the electrical generator, and a fourth gear between the second and third gears which is connected to a fifth gear, the fifth gear being operatively connected to a second variable coupling connected to an external device.

18. The system of claim 17, wherein the gear assembly has a high transmission ratio.

19. The system of claim 18, wherein the transmission ratio from the first gear to the third gear is at least 100 to 1.

20. The system of claim 17, wherein the second variable coupling comprises opposed third and fourth plates each having permanent magnets affixed thereto, wherein the extension of the magnets on one of the plates of the second variable coupling are adjustable.

21. The system of claim 20, wherein the third plate is connected to the fifth gear and includes radially positioned, spaced apart permanent magnets extending therefrom, and the fourth plate is in spaced relation to the third plate and includes radially positioned, spaced apart permanent magnets extending therefrom so as to extend between the permanent magnets of the third plate, wherein the extension of the permanent magnets on one of the plates of the second variable coupling is adjustable by at least one solenoid connector to the one of the plates of the second variable coupling, whereby the rotation of the third plate by the motor causes the fourth plate to rotate by repulsive magnetic force.

22. The system of claim 20, wherein the external device includes a rotating blade.

23. The system of claim 17, wherein the electrical generator is electrically coupled to the motor.

24. An electrical generating system, comprising:
an electric motor coupled to a external power source;
a variable coupling connected to an output shaft of the motor;
a switching mechanism for adjusting the variable coupling;
a gear assembly connected to the magnetic coupling, the gear assembly having a high transmission ration and including a first gear rotatably connected to the variable coupling and rotatably engaging a second gear of smaller diameter, the second gear rotatably engaging a third gear having a larger diameter than the second gear, a fourth gear between the second and third gears which is connected to a fifth gear, the fifth gear being operatively connected to a second variable coupling connected to an external device; and
an electrical generator connected to the gear assembly through the third gear and electrically coupled to the motor.

25. The systems of claim 24, wherein the second variable coupling comprises opposed third and fourth plates each having permanent magnets affixed thereto, wherein the extension of the magnets on one of the plates of the second variable coupling are adjustable.

26. The system of claim 25, wherein the third plate is connected to the fifth gear and includes radially positioned, spaced apart permanent magnets extending therefrom, and the fourth plate is in spaced relation to the third plate and includes radially positioned, spaced apart permanent magnets extending therefrom so as to extend between the permanent magnets of the third plate, wherein extension of the permanent magnets on at least one of the plates of the second variable coupling is adjustable by at least one solenoid connected to the at least one of the plates of the second variable coupling, whereby the rotation of the third plate by the motor causes the fourth plate to rotate by repulsive magnetic force.

* * * * *